United States Patent
Müller et al.

(10) Patent No.: US 6,452,675 B1
(45) Date of Patent: Sep. 17, 2002

(54) THIN-FILM SPECTROMETER WITH TRANSMISSION GRID

(76) Inventors: Jörg Müller, Meilsener Heide 9, D-21244 Buchholz (DE); Dietmar Sander, Heidberg 39, D-22301 Hamburg (DE)

(*) Notice: Subject to any disclaimer, the term of this patent is extended or adjusted under 35 U.S.C. 154(b) by 0 days.

(21) Appl. No.: 09/646,434
(22) PCT Filed: Mar. 17, 1999
(86) PCT No.: PCT/EP99/01744
§ 371 (c)(1),
(2), (4) Date: Sep. 18, 2000
(87) PCT Pub. No.: WO99/47952
PCT Pub. Date: Sep. 23, 1999

(30) Foreign Application Priority Data

Mar. 19, 1998 (DE) .......................... 198 11 989

(51) Int. Cl.⁷ .............................. G01J 3/18; G02B 6/124
(52) U.S. Cl. ...................................... 356/328
(58) Field of Search .................. 356/326, 328

(56) References Cited

U.S. PATENT DOCUMENTS 4,938,553 A   7/1990   Maerz et al.

FOREIGN PATENT DOCUMENTS

DE   196 02 584 A1   7/1997

OTHER PUBLICATIONS

Sander D et al: "Breitbandiges Optisches Mikrospektrometer ALS Mikroanalysesystem" Technisches Messen TM, vol. 64, No. 4, Apr. 1, 1997, (Apr. 04,1997), pp. 143–146, XP000704274, ISSN: 0171–8096.
Sander D et al: "Microspectrometer With Slab–Waveguide Transmission Gratings" Applied Optics, vol. 35, No. 27, Sep. 20, 1996 pp. 4096–4101, XP000627426, ISSN: 0003–6935.

Primary Examiner—F. L. Evans
(74) Attorney, Agent, or Firm—Rankin, Hill, Porter & Clark LLP

(57) ABSTRACT

A spectrometer fitted with a thin light guide layer in a stratification manufactured by thin-film technology, said light guide being sandwiched between two cover layers of lower index of refraction, said layer light guide's end face comprising a grating which is illuminated with the light to be analyzed and passing through the said light guide layer, the spectrometer furthermore comprising a line sensor onto which is imaged the spectrum, the staircase echelon grating being fitted with transparent step surfaces and with step edges perpendicular to said layer's plane, a second medium forming an interface with the grating's step surfaces and having an index of refraction less than that of the light guide layer, characterized in that the height and the width of the grating continuously change in the staircase direction in such manner that for two selected wavelengths the particular total optical paths through the light guide layer and the second medium as far as a focal point pertaining the particular wavelength shall differ by the same multiple of the particular wavelength.

6 Claims, 3 Drawing Sheets

THIN-FILM SPECTROMETER WITH TRANSMISSION GRID

BACKGROUND OF THE INVENTION

Thin-film spectrometers comprising a stratified film including a light-guiding layer and an echelon or staircase grating can be implemented in two basic grating variations, as disclosed in the European patent document 0 250 824 A1. Such staircase gratings can be provided as a reflection grating, as shown in FIG. 1 of the aforementioned EP document, or as a transmission grating, as shown in FIGS. 3 through 6 of the aforementioned EP document.

FIG. 1 of the EP document shows that a reflection grating offers the advantage that it can be made self-focusing by its overall curvature. A transmission grating, on the other hand, requires separate focusing means, as shown in WO 97/27 460. As shown in the WO document, a transmission grating offers the substantial advantage over a reflection grating that, once the indices of refraction in the light-guiding layer and in the second medium have been appropriately selected, the step height at the same spectrometer wavelength resolution can be larger the grating may be manufactured in relatively economic and accurate manner.

In the state of the art, the gratings of both types are designed with rigorously constant step sizes.

Moreover focusing echelon or staircase gratings, also called just a "echelons", beyond the above species are known wherein. the steps change continuously in the direction the staircase. Illustratively such staircase gratings are part of the Fresnel zone plate as ilustratively discussed in GRIMSEHLS LEHRBUCH DER PHYSIK, 1944, Teubner, p 387.

A more recent application of this principle is found in the article

Collimating cylindrical diffractive lenses:

rigorous electromagnetic analysis and scalar approximation

Elias N Glytsis

APPLIED OPTICS, vol. 37, #1, Jan. 1, 1998, pp 34–43.

In this design the steps are of constant height. Only the step width varies.

All grating designs based on the Fresnel zone principle share the feature they can only reproduce a single wavelength at one focal point. No imaging takes place at other wavelengths and consequently this design is inapplicable to a spectrometer and hence outside the species being considered.

Another grating design beyond the species is known from the article,

Diffractive phase elements that implement wavelength demultiplexing and spatial annular focusing simultaneously, Bi-Zhen Dong et al J. Opt. Soc. Am. A, vol. 14, #1, January 1997, pp 44–48. In this grating the line spacings are constant and the step heights are configured in a complex, wholly irregular topography which, by means of a very complex calculation, determines focusing conditions for different wavelengths only approximately. Such a height topography is shown therein as FIG. 2a. FIG. 2 shows the spectrum with the diffraction errors (spurious lines). This design is manifestly unsuited for practical applications.

SUMMARY OF THE INVENTION

An object of the present invention is to create a spectrometer of the above indicated species which comprises a transmission grating that focuses the spectrum in simple manner.

The present invention is further directed toward a spectrometer having a light guide layer and a line sensor, the light guide layer being sandwiched between two cover layers. The cover layers have a lower index of refraction as compared to the light guide layer. An end surface of the light guide layer having an end surface fitted with a grating upon which light passing through the light guide layer is incident. The line sensor has imaged thereon a spectrum. The staircase grating is fitted with transparent step surfaces and with step edges perpendicular to the plane of the layer. The grating's step surfaces form an interface with a second medium having an index of refraction that is less than the index of refraction of the light guide layer.

The height and the width of the grating continuously changes in the staircase direction such that, for two selected wave lengths, the total optical paths through the light guide layer and the second medium as far as one of the focal points pertaining to its particular wavelength shall differ for all adjacent front surfaces of the grating by a length difference which is a multiple of this very wave length.

The individual, mutually similar but nevertheless ever smaller steps for the grating of the invention can be computed sequentially step by step in serial calculation stages. The required number of steps, for instance one thousand, can be calculated in a very short time by a computer. In this procedure the light paths (geometric path multiplied by the index of refraction of the particular medium) to the grating and from the grating to the focal point can be computed each time for two adjacent front surfaces of the grating. These computations are carried out for two selected wavelengths within the spectrum being analyzed with previously determined focal points for each wavelength.

Constructive interference takes place for each wavelength and for two adjacent front surfaces at one step at the focal point belonging to the particular wavelength. The interference of one front surface with the light of the next front surfaces in one direction will be constructive interference with a light path difference which is a higher multiple of the wavelength. As a result, not only does such a grating focus at the two focal points for the two selected wavelengths, but it will also focus intermediate wavelengths and wavelengths outside this interval at focal points which, except for minute and unobjectionable deviations, shall be situated in a focal plane determined by the two selected focal points. A spectrometer of this kind will image the spectrum itself while using a transmission grating and while retaining the grating's advantageous properties regarding allowable, increased step heights, and additional focusing means, therefore, are not needed. In this manner the design is considerably simplified relative to known spectrometers using transmission ratings and with additional focusing means.

In accordance with further features of the invention, the spectrometer's stratification ends at the echelon grating, and as a result layer manufacture can be simplified.

In further accordance with an alternative embodiment of the present invention, the second medium is constituted by a light guiding layer on the other side of the staircase rating. According to this embodiment, more options are offered by selecting the media of the first and second light guide layers so as to attain an advantageous and very small difference between the indices of refraction adjoining the echelon, whereby, and as elucidated in WO 97/27 460, larger step heights are possible at a given wavelength resolution.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
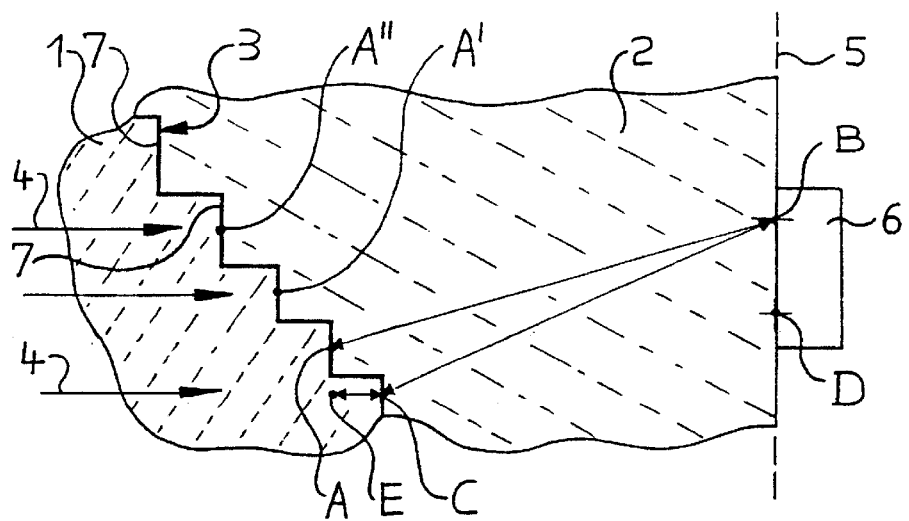
FIG. 1 shows the basic configuration as a section of an echelon grating.

In a section parallel to the optical paths, FIG. 1 shows a light-guiding layer 1 made of a transparent medium of index of refraction $n_1$ and adjoining by a boundary surface, in the form of an staircase grating 3 of which the surfaces run perpendicularly to the plane of the drawing, a second medium 2 of index of refraction $n_2$. The staircase grating 3 is illuminated through the light guide layer 1 with a collimated light 4 which is to be analyzed. The spectrum shall be projected on an end surface 5 of the second medium 2 and acting as the focal plane, and this spectrum shall be detected by a sensor, for instance a line sensor 6. Light passes from the grating 3 into the second medium 2 from the front surfaces 7 of the grating. If the optic paths are computed from center points C, A, A', A" of the front surfaces 7, the conditions for constructive interference may be computed. The shape of the staircase grating 3 continuously increases in step size in the staircase direction is computed as follows on the basis of the features of claim 1:

In FIG. 1, light is incident from the left in the direction of the beams 4 on the grating 3. First a wavelength $\lambda_b$ is investigated. The light of wavelength $\lambda_b$ is focused on the focal point B on the end surface 5.

In the second medium 2 the light covers the path CB from point C on a grating front surface to the focal point B. The optical path is the product of CB and $n_2$. Point A is situated at the adjacent front surface of the next step. The optical path in the light guide layer 1 to this point A is shorter by the interval $n_1(EC)$. The optical path in the medium 2 is $n_2(AB)$. There shall be constructive interference at point B if the formula $$n_2(AB) = n_2(BC) + n_1(CE) + m\lambda_b$$

is satisfied. Accordingly, the total optical paths through these two adjacent grating steps C and A at the wavelength $\lambda_b$ differ by a multiple of this wavelength.

The aforementioned geometric construction based on points C and A is now carried out in relation to the focal point D. The above equation is used again, however for the wavelength $\lambda_d$. Two independent equations with two unknowns are set up in the form of the coordinates of the point A to be computed if the points B, C and D are assumed known. The position of point A for instance in an x-y coordinate system can be ascertained from two equations with two unknowns.

Based upon such computation and now knowing the position of point A, the next point A' can be computed, and based on latter, the point A". In this manner the entire grating can be determined in terms of its steps by computing the points A, A', A" etc. each as the centers of the front surfaces.

This computation proceeds from one step to the next and in the above equation the last term $m\lambda_b$ or $m\lambda_d$ always has the same value of m, for instance 1.

In this incremental computation from one grating step to the next, rounding errors would be continuously added. Therefore another computing procedure is more advantageous, namely:

First, as indicated above, the point A is computed based on C in the aforementioned manner. Next, based on C, the point A' is computed directly. Both wavelengths result in the same equations as listed above, however m now is raised by 1 (to m+1). In the next step and based on C, A" is computed directly, now m becoming m+2, etc. The accuracy of computation is enhanced because the same point C is always used.

A grating 3 computed by means of this algorithm focuses the wavelengths $\lambda_b$ and $\lambda_d$ in wholly error-free manner at the points B and D in the plane 5, also wavelengths outside $\lambda_b$ and $\lambda_d$ outside the points B and D. The spectral imaging in the plane 5 is error free. Only minute, negligible defocusing takes place outside the points B and D.

Using such a grating, and operating in the optical range with glass for the light guiding layer 1 and air for the second medium 2 at wavelengths $\lambda_b$ and $\lambda_d$ resp. 400 and 550 nm, the distance CD being 10 mm, the focal plane distance BD may be 2 mm. The corresponding grating period is about 1 $\mu$ which for instance over $10^3$ steps increases approximately linearly to 5 $\mu$. The minimum structural width of the autofocus grating so made is only a little less than the structural values of a non-focusing grating of constant grating period.

The calculation is carried out in a very simple and incremental manner using a computer. The calculations include the following parameters of the grating to be computed: the indices of refraction of the two media at the grating interface, the position of the two focal points B and D, both from each other and from the basis C of the calculation, for two predetermined spectrum wavelengths. Each time an echelon grating is implemented wherein the step size increases in one direction. For a given spacing between the points B and D, the grating may run substantially straight as shown in FIG. 1. If the focal points B and D are close together, the grating, as seen from these focal points, is basically convexly-curved, and if they are far apart, it is basically concave.

Figure 2:
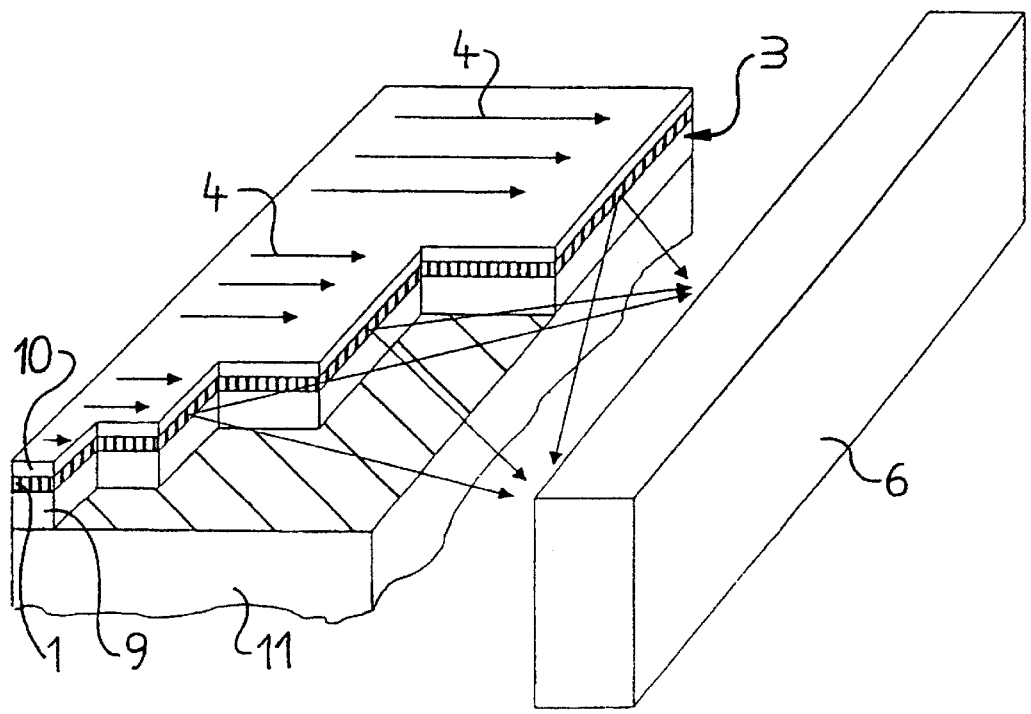
FIG. 2 is a perspective of a spectrometer with layered design and air as the second medium.

FIG. 2 shows an overall design where the second medium 2 is air. The light guide layer 1 is covered at its top and bottom by cover layers 9 and 10 of a lower index of refraction. This stratification is mounted on a substrate 11. The stratification ends at the grating 3. The incident collimated light from the light guide layer already is focused on the line sensor 6 of FIG. 1.

Figure 3:
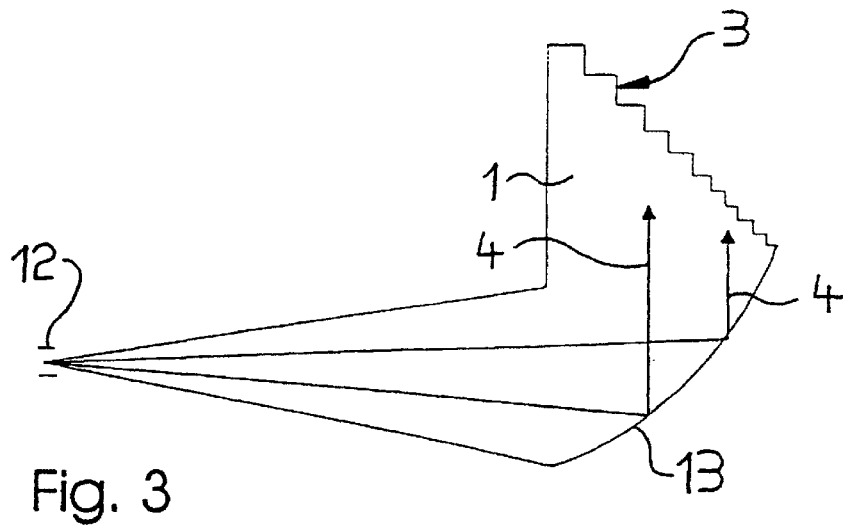
FIG. 3 is a diagrammatic top view of a spectrometer with a concave mirror to collimate the light from the source slit.

FIG. 3 is an embodiment variation wherein diverging light from a source slit 12 is incident on a concave mirror 13, for instance an interface between, the light guide layer 1 and a material of lower index of refraction, and is collimated to be incident in that form on the echelon 3.

Figure 4:
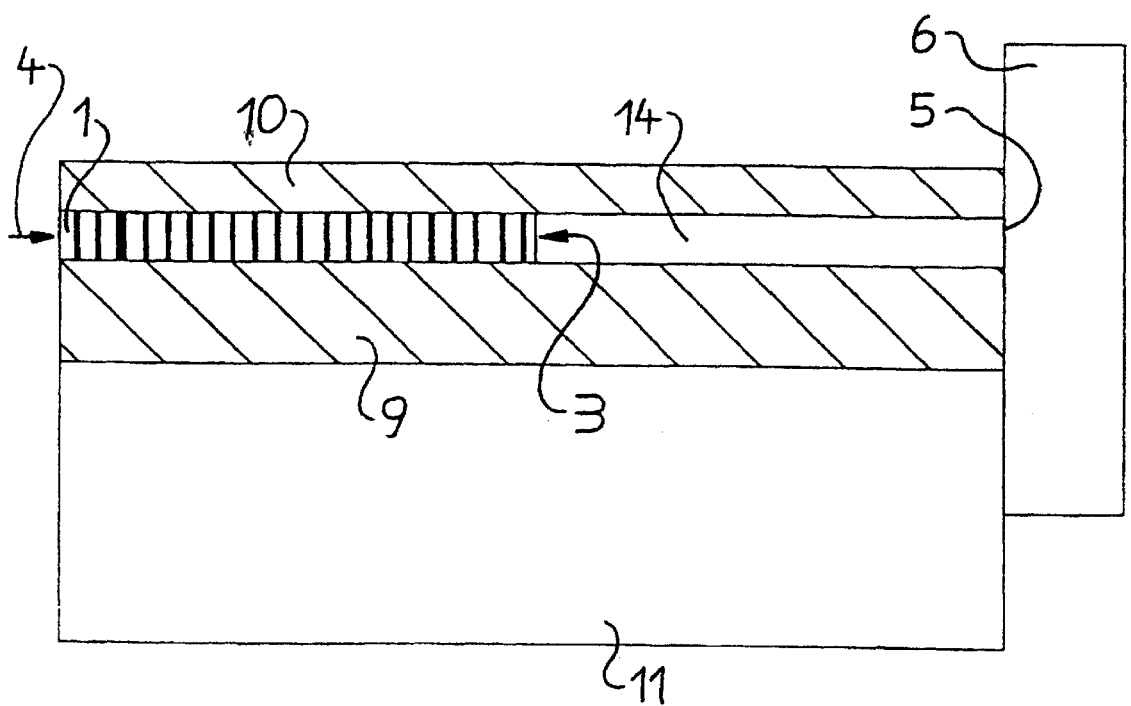
FIG. 4 is a longitudinal section of the stratification of a spectrometer with a continuing second light guide layer as the second medium.

FIG. 4 is a longitudinal section of the stratification of a design similar to that of FIG. 2 and comprising a substrate 11, the light guide layer 1 and the cover layers 9 and 10 wherein, however, the light guide layer 1 at the grating 3 does not form an interface with air as in the design of FIG. 2, but rather with a continuing light guide layer 14 of which the end face 5 joins the line sensor.

Figure 5:
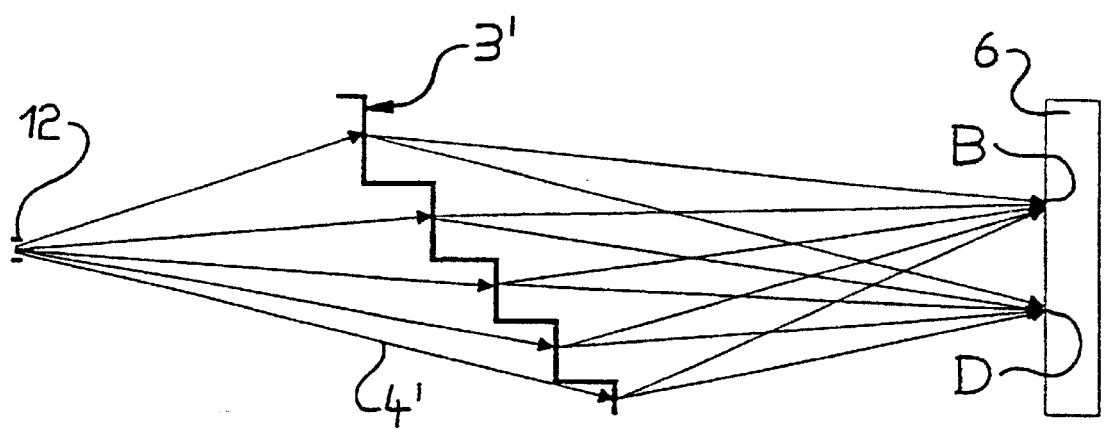
FIG. 5 is a view similar to that of FIG. 1 where divergent light is incident on the grating.

FIG. 5 diagrammatically shows the imaging configuration corresponding to that of FIG. 1. This FIGURE however also shows that focusing conditions, namely imaging a wavelength $\lambda_b$ on the focal point B and a wavelength $\lambda_d$ on the focal point D, can be implemented when using divergent light from a source slit 12 and incident on a grating 3'. The initially cited optical path equation need be adjusted only slightly, also taking into account triangles issuing from the source slit 12 in the light guide layer 1.

It is respectfully submitted that although the preferred embodiments of the present invention have been described herein, the present invention is not limited thereto. Rather, the scope of the present invention is only defined in the claims appended hereto.

What is claimed is:

1. A spectrometer comprising a sensor (6) and a light guide layer (1), said light guide layer (1) being sandwiched between two cover layers (10, 9), said cover layers (10, 9) having an index of refraction that is lower than an index of refraction of said light guide layer (1), said light guide layer (1) including an end surface defining a staircase grating (3, 3') upon which is incident light (4, 4') passing through the light guide layer, said sensor (6) having a spectrum imaged thereon (B, D), the staircase grating (3, 3') being fitted with transparent step surfaces (7) and with step edges perpendicular to the plane of the layer and forming, at the grating's step surfaces, an interface with a second medium (2) said second medium having an index of refraction that is less than the index of refraction of the light guide layer, a height of said step edges and a width of said step surfaces of the staircase grating (3, 3') continuously changes such that, for each of two selected wavelengths ($\lambda_b, \lambda_d$), a total optical path through the light guide layer (1), through one of the transparent step surfaces (7), and through the second medium (2) as far as a respective focal point (B, D) pertaining to the respective wavelength shall differ from adjacent step surfaces (7) of the grating (3) by a length which is a multiple of the respective wavelength.

2. The spectrometer as claimed in claim 1, wherein the second medium (2) is air.

3. The spectrometer as claimed in claim 1, wherein the second medium consists of a second light guide layer (14) abutting the grating (3).

4. The spectrometer as claimed in claim 1, wherein the grating (3) is illuminated with collimated light (4).

5. The spectrometer as claimed in claim 1, wherein the grating (3') is illuminated with diverging light (4').

6. The spectrometer as claimed in claim 1 wherein the light guide is manufactured using thin film technology.

* * * * *

UNITED STATES PATENT AND TRADEMARK OFFICE
CERTIFICATE OF CORRECTION

PATENT NO.    : 6,452,675 B1                                    Page 1 of 1
DATED         : September 17, 2002
INVENTOR(S)   : Muller et al.

It is certified that error appears in the above-identified patent and that said Letters Patent is hereby corrected as shown below:

Title page,
Item [76], Inventors, delete "Heidberg 39, D-22301" and insert -- Quellenweg 6, D-20535 --.

Column 1,
Line 26, after "just" delete "a".
Line 27, after "wherein" delete "." (period).
Line 28, after "tion" insert -- of --.

Column 2,
Line 56, delete "rating" and insert -- grating --.

Column 3,
Line 26, after "6." begin new paragraph.

Column 4,
Line 63, delete "FIGURE" and insert -- Figure --.

Column 5,
Line 21, after "(2)" insert -- , -- (comma).

Signed and Sealed this

Twenty-fourth Day of December, 2002

JAMES E. ROGAN
*Director of the United States Patent and Trademark Office*